United States Patent
Li et al.

(10) Patent No.: US 11,184,116 B2
(45) Date of Patent: Nov. 23, 2021

(54) TECHNIQUES AND APPARATUSES FOR HYBRID AUTOMATIC REPEAT REQUEST DESIGN OF POLAR CODES FOR ULTRA-RELIABLE LOW LATENCY COMMUNICATIONS

(71) Applicant: QUALCOMM Incorporated, San Diego, CA (US)

(72) Inventors: Jian Li, Beijing (CN); Changlong Xu, Beijing (CN); Kai Chen, Shenzhen (CN); Liangming Wu, Beijing (CN); Jing Jiang, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/758,549

(22) PCT Filed: Oct. 2, 2018

(86) PCT No.: PCT/CN2018/109234
§ 371 (c)(1),
(2) Date: Apr. 23, 2020

(87) PCT Pub. No.: WO2019/095886
PCT Pub. Date: May 23, 2019

(65) Prior Publication Data
US 2020/0351029 A1    Nov. 5, 2020

(30) Foreign Application Priority Data
Nov. 20, 2017   (WO) ................ PCT/CN2017/111835

(51) Int. Cl.
*H04L 1/18* (2006.01)
*H04L 1/00* (2006.01)

(52) U.S. Cl.
CPC .......... *H04L 1/1816* (2013.01); *H04L 1/0057* (2013.01); *H04L 1/1819* (2013.01); *H04L 1/1845* (2013.01)

(58) Field of Classification Search
CPC ... H04L 1/1816; H04L 1/0057; H04L 1/1819; H04L 1/1845
See application file for complete search history.

(56) References Cited

U.S. PATENT DOCUMENTS

| 2015/0230117 A1 | 8/2015 | Sanayei et al. |
| 2016/0380763 A1 | 12/2016 | Ahn et al. |

(Continued)

FOREIGN PATENT DOCUMENTS

| CN | 106817195 A | 6/2017 |
| CN | 106936548 A | 7/2017 |

(Continued)

OTHER PUBLICATIONS

3GPP TR 38.912 V1 0.0, 3rd Generation Partnership Project; Technical Specification Group Radio Access Network Study on New Radio (NR) Access Technology, (Release 14), Mar. 2017, pp. 1-74.

(Continued)

*Primary Examiner* — Kyle Vallecillo
(74) *Attorney, Agent, or Firm* — Michael J. DeHaemer, Jr.

(57) ABSTRACT

Various aspects of the present disclosure generally relate to wireless communication. In some aspects, a wireless communication device may perform a first transmission of a communication that is encoded using a polar coding technique; and perform at least one retransmission of the communication, wherein more resources are allocated for the at least one retransmission than for the first transmission, and wherein the at least one retransmission includes an incre- (Continued)

mental redundancy version of the communication and a version of the communication for Chase combination. Numerous other aspects are provided.

44 Claims, 8 Drawing Sheets

(56) References Cited

U.S. PATENT DOCUMENTS

| | | | |
|---|---|---|---|
| 2017/0181104 A1 | 6/2017 | Jang et al. | |
| 2018/0070369 A1* | 3/2018 | Papasakellariou | H04W 16/14 |
| 2018/0115393 A1* | 4/2018 | Zhang | H04L 1/1816 |
| 2018/0167931 A1* | 6/2018 | Papasakellariou | H04L 1/1854 |
| 2018/0205395 A1* | 7/2018 | Nammi | H04L 1/1816 |
| 2018/0227077 A1* | 8/2018 | Lee | H03M 13/6306 |
| 2020/0022144 A1* | 1/2020 | Papasakellariou | H04W 72/0453 |
| 2020/0059821 A1* | 2/2020 | Wirth | H04L 5/0094 |

FOREIGN PATENT DOCUMENTS

| | | |
|---|---|---|
| CN | 107294652 A | 10/2017 |
| WO | 2007149049 A1 | 12/2007 |
| WO | 2017176309 A1 | 10/2017 |

OTHER PUBLICATIONS

Huawei et al., "Channel coding for URLLC", 3GPP TSG RAN WG1 Meeting 90bis, R1-1718374, Oct. 13, 2017, 11 pages.
Huawei, et al., "Channel Coding for URLLC", 3GPP TSG RAN WG1 Meeting 91, 3GPP Draft, R1-1720759 Channel Coding for URLLC, 3rd Generation Partnership Project (3GPP), Mobile Competence Centre; 650, Route Des Lucioles; F-06921 Sophia-Antipolis Cedex; France, vol. Ran WG1, No. Reno, USA; Nov. 27, 2017-Dec. 1, 2017, Nov. 18, 2017 (Nov. 18, 2017), 16 Pages, XP051370210, Retrieved from the Internet: URL:http://www.3gpp.org/ftp/tsg%5Fran/WG1%5FRL1/TSGR1%5F91/Docs/ [retrieved on Nov. 18, 2017] Sections 2.3.2 and 3 References.
International Search Report and Written Opinion—PCT/CN2017/111835—ISA/EPO—dated Aug. 9, 2018.
International Search Report and Written Opinion—PCT/CN2018/109234—ISA/EPO—dated Jan. 4, 2019.
RAN1: "LS on Channel Coding ", 3GPP TSG RAN WG4 Meeting #84Bis, R4-1710120, Oct. 13, 2017, 18 pages.
Supplementary European Search Report—EP18877512—Search Authority—The Hague—dated Jul. 1, 2021.

* cited by examiner

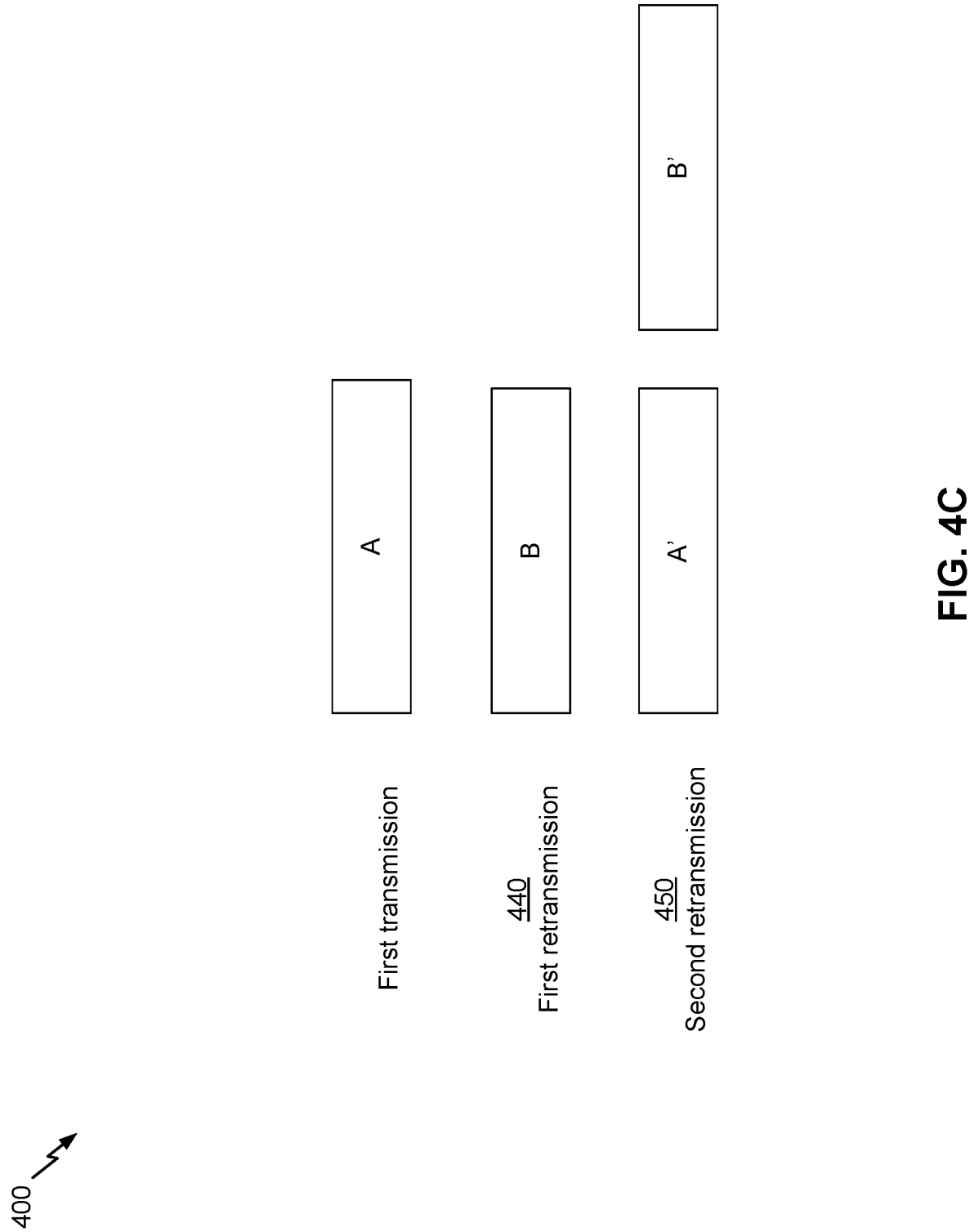

TECHNIQUES AND APPARATUSES FOR HYBRID AUTOMATIC REPEAT REQUEST DESIGN OF POLAR CODES FOR ULTRA-RELIABLE LOW LATENCY COMMUNICATIONS

CROSS-REFERENCE TO RELATED APPLICATIONS

This application is a 371 national stage of PCT Application No. PCT/CN2018/109234, filed on Oct. 2, 2018, entitled "TECHNIQUES AND APPARATUSES FOR HYBRID AUTOMATIC REPEAT REQUEST DESIGN OF POLAR CODES FOR ULTRA-RELIABLE LOW LATENCY COMMUNICATIONS" which, claims priority to Patent Cooperation Treaty (PCT) Patent Application No. PCT/CN2017/111835, filed on Nov. 20, 2017, entitled "TECHNIQUES AND APPARATUSES FOR HYBRID AUTOMATIC REPEAT REQUEST DESIGN OF POLAR CODES FOR ULTRA-RELIABLE LOW LATENCY COMMUNICATIONS," all of which are incorporated by reference herein.

FIELD OF THE DISCLOSURE

Aspects of the present disclosure generally relate to wireless communication, and more particularly to techniques and apparatuses for hybrid automatic repeat request (HARQ) design of polar codes for ultra-reliable low latency communications (URLLC).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a wireless communication device may include performing a first transmission of a communication that is encoded using a polar coding technique; and performing at least one retransmission of the communication, wherein more resources are allocated for the at least one retransmission than for the first transmission, and wherein the at least one retransmission includes an incremental redundancy version of the communication and a version of the communication for Chase combination.

In some aspects, a wireless communication device may include a memory and one or more processors operatively coupled to the memory. The memory and the one or more processors may be configured to perform a first transmission of a communication that is encoded using a polar coding technique; and perform at least one retransmission of the communication, wherein more resources are allocated for the at least one retransmission than for the first transmission, and wherein the at least one retransmission includes an incremental redundancy version of the communication and a version of the communication for Chase combination.

In some aspects, a non-transitory computer-readable medium may store one or more instructions for wireless communication. The one or more instructions, when executed by one or more processors of a wireless communication device, may cause the one or more processors to perform a first transmission of a communication that is encoded using a polar coding technique; and perform at least one retransmission of the communication, wherein more resources are allocated for the at least one retransmission than for the first transmission, and wherein the at least one retransmission includes an incremental redundancy version of the communication and a version of the communication for Chase combination.

In some aspects, an apparatus may include means for performing a first transmission of a communication that is encoded using a polar coding technique; and means for performing at least one retransmission of the communication, wherein more resources are allocated for the at least one retransmission than for the first transmission, and wherein the at least one retransmission includes an incremental redundancy version of the communication and a version of the communication for Chase combination.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4A-4D are diagrams illustrating examples of transmission and retransmission configurations for HARQ for polar coded URLLC communications, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
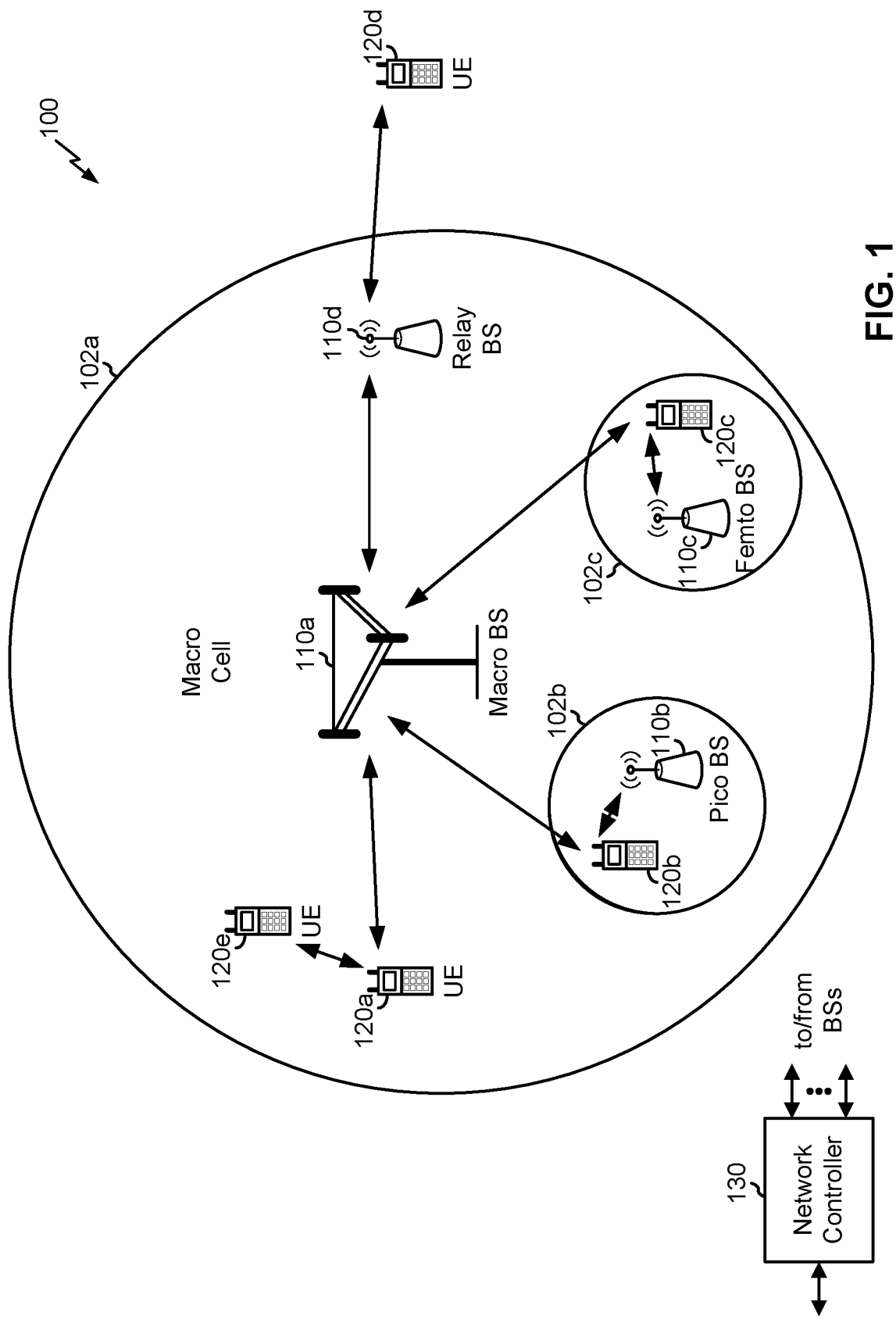
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples are possible and may differ from what was described with regard to FIG. 1.

Figure 2:
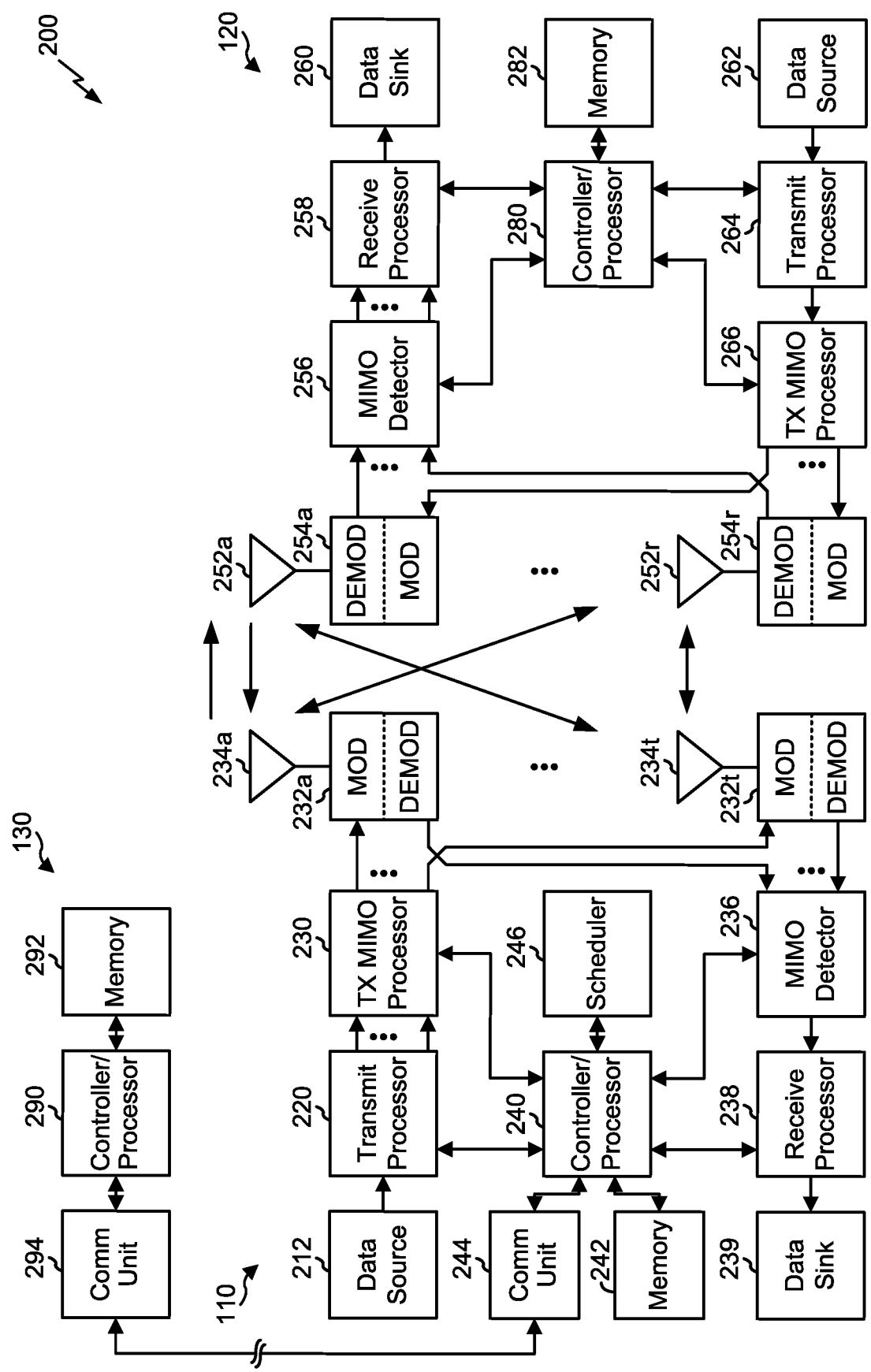
FIG. 2 is a block diagram conceptually illustrating an example of a base station in communication with a user equipment (UE) in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with HARQ of polar codes for URLLC, as described in more detail elsewhere herein. For example, controller/processor 240 of BS 110, controller/processor 280 of UE 120, and/or any other component(s) of FIG. 2 may perform or direct operations of, for example, process 500 of FIG. 5 and/or other processes as described herein. Memories 242 and 282 may store data and program codes for BS 110 and UE 120, respectively. A scheduler 246 may schedule UEs for data transmission on the downlink and/or uplink.

In some aspects, a wireless communication device (e.g., BS 110 and/or UE 120) may include means for performing a first transmission of a communication that is encoded using a polar coding technique; means for performing at least one retransmission of the communication, wherein more resources are allocated for the at least one retransmission than for the first transmission, and wherein the at least one retransmission includes an incremental redundancy version of the communication and a version of the communication for Chase combination; and/or the like. In some aspects, such means may include one or more components of BS 110 and/or UE 120 described in connection with FIG. 2.

As indicated above, FIG. 2 is provided merely as an example. Other examples are possible and may differ from what was described with regard to FIG. 2.

A communication in a wireless network may be associated with a latency and/or reliability requirement. In some aspects, a HARQ technique may be used to achieve a reliability requirement. For example, when a first transmission of a communication is unsuccessful, a wireless communication device (e.g., BS 110 and/or UE 120) may retransmit the communication until the communication is successfully decoded by a recipient device. Incremental redundancy (IR) is one approach for HARQ retransmission, wherein each retransmission contains different information (e.g., data and/or parity bits) than the previous retransmission or transmission. Chase combination is another approach for HARQ, wherein every retransmission contains the data and parity bits. For polar codes with a low coding rate, IR may have small gains over Chase combination.

However, the stringent latency requirements associated with URLLC communications may impose a limit on how many retransmissions can be performed. Furthermore, using an equal resource size for a first transmission and a retransmission may be inefficient, thereby further increasing the amount of time needed to successfully provide URLLC and further increasing the difficulty of satisfying the URLLC requirements.

Some techniques and apparatuses described herein perform a first transmission of a communication that is encoded using a polar coding technique, and perform at least one retransmission of the communication (e.g., based at least in part on a HARQ technique). More resources may be allocated for the at least one retransmission than for the first transmission, thereby increasing efficiency of the HARQ technique. Furthermore, the at least one retransmission may include an IR version of the communication and a version of the communication for Chase combination. This may further increase a likelihood of success of the HARQ technique. In this way, throughput is increased while satisfying latency requirements. Furthermore, each retransmission of the at least one retransmission may be self-decodable (e.g., decodable without the first transmission), which increases resilience of the communication and increases a likelihood of success of the HARQ technique.

Figure 3:
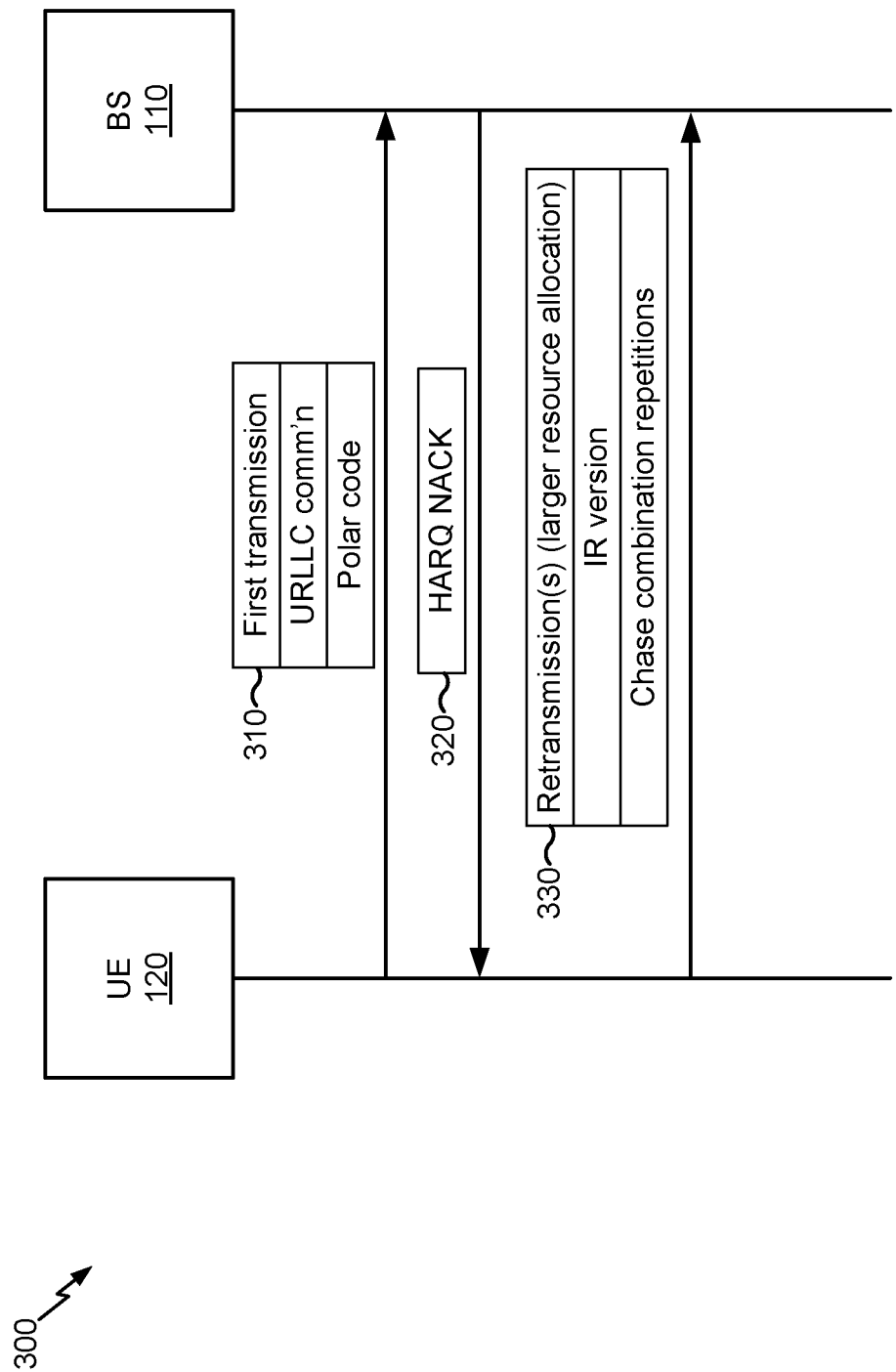
FIG. 3 is a diagram illustrating an example of a HARQ technique for a polar coded URLLC communication, in accordance with various aspects of the present disclosure.

FIG. 3 is a diagram illustrating an example 300 of a HARQ technique for a polar coded URLLC communication, in accordance with various aspects of the present disclosure. FIG. 3 shows a UE 120 in communication with a BS 110. In example 300, UE 120 is the wireless communication device described herein that performs the first transmission and the at least one retransmission. However, in some aspects, BS 110 or another device may perform the first transmission and the at least one retransmission.

As shown by reference number 310, UE 120 may perform a first transmission of a communication. For example, the communication may be a URLLC communication that is associated with a latency requirement and/or a reliability requirement. As further shown, the communication may be polar coded. In some aspects, the techniques and apparatuses described herein may be applied for coding techniques other than polar coding.

As shown by reference number 320, the BS 110 may provide a HARQ negative acknowledgment (negative ACK or NACK). The HARQ NACK may indicate that the BS 110 did not successfully decode the first transmission. Therefore, the UE 120 may need to perform one or more retransmissions of the communication to satisfy the latency requirement and/or the reliability requirement. However, performing the one or more retransmissions with resource allocations equal to a resource allocation for the first transmission may be inefficient in comparison to performing the first transmission and the at least one retransmission with unequal resource allocations. As an illustrative example, assume equal resource sizes for a first transmission and a single retransmission. Assume further that the first transmission is transmitted using (for example) 2 resources and with a frame error rate (FER) of 0.01, and that the single retransmission is transmitted using 2 resources and with a FER of 1e−5 (e.g., to satisfy a URLLC requirement). In this case, the expected amount of resources needed to successfully perform the communication may be equal to 2*0.99+ (2+2)*0.01=2.02.

As shown by reference number 330, the UE 120 may perform at least one retransmission of the communication based at least in part on receiving the HARQ NACK. As further shown, the at least one retransmission may have a larger resource allocation than the first transmission. As another illustrative example, assume that the first transmission is transmitted using 1 resource with a FER of 0.1, and assume that the one or more retransmissions are transmitted using 3 resources collectively with a collective FER of 1e−5. In this case, the expected amount of resources needed to successfully perform the communication may be equal to 1*0.9+(1+3)*0.1=1.3. Thus, resource efficiency and throughput are increased for URLLC communications.

As further shown, the at least one retransmission may include an IR version of the communication and/or a Chase combination version of the communication (e.g., one or more repetitions of the communication for Chase combining). Examples of content of the at least one retransmission are described in more detail elsewhere herein. By performing retransmission of the IR version and the Chase combination version, HARQ performance is improved in comparison to performing retransmission of only one of the IR version or the Chase combination version. Furthermore, self-decoding of the at least one retransmission may be possible, which further improves HARQ performance.

In some aspects, the wireless communication device (e.g., UE 120) may perform multiple retransmissions. For example, UE 120 may perform a first retransmission and may determine whether the first retransmission was successful according to a HARQ ACK or NACK received from BS 110. If the first retransmission is successful, UE 120 may cease retransmission. If the first retransmission is not successful, UE 120 may perform a second retransmission, and may continue to perform retransmissions until a HARQ ACK is received from BS 110.

As indicated above, FIG. 3 is provided as an example. Other examples are possible and may differ from what was described with respect to FIG. 3.

FIGS. 4A-4D are diagrams illustrating examples 400 of transmission and retransmission configurations for HARQ for polar coded URLLC communications, in accordance with various aspects of the present disclosure.

Figure 4A:
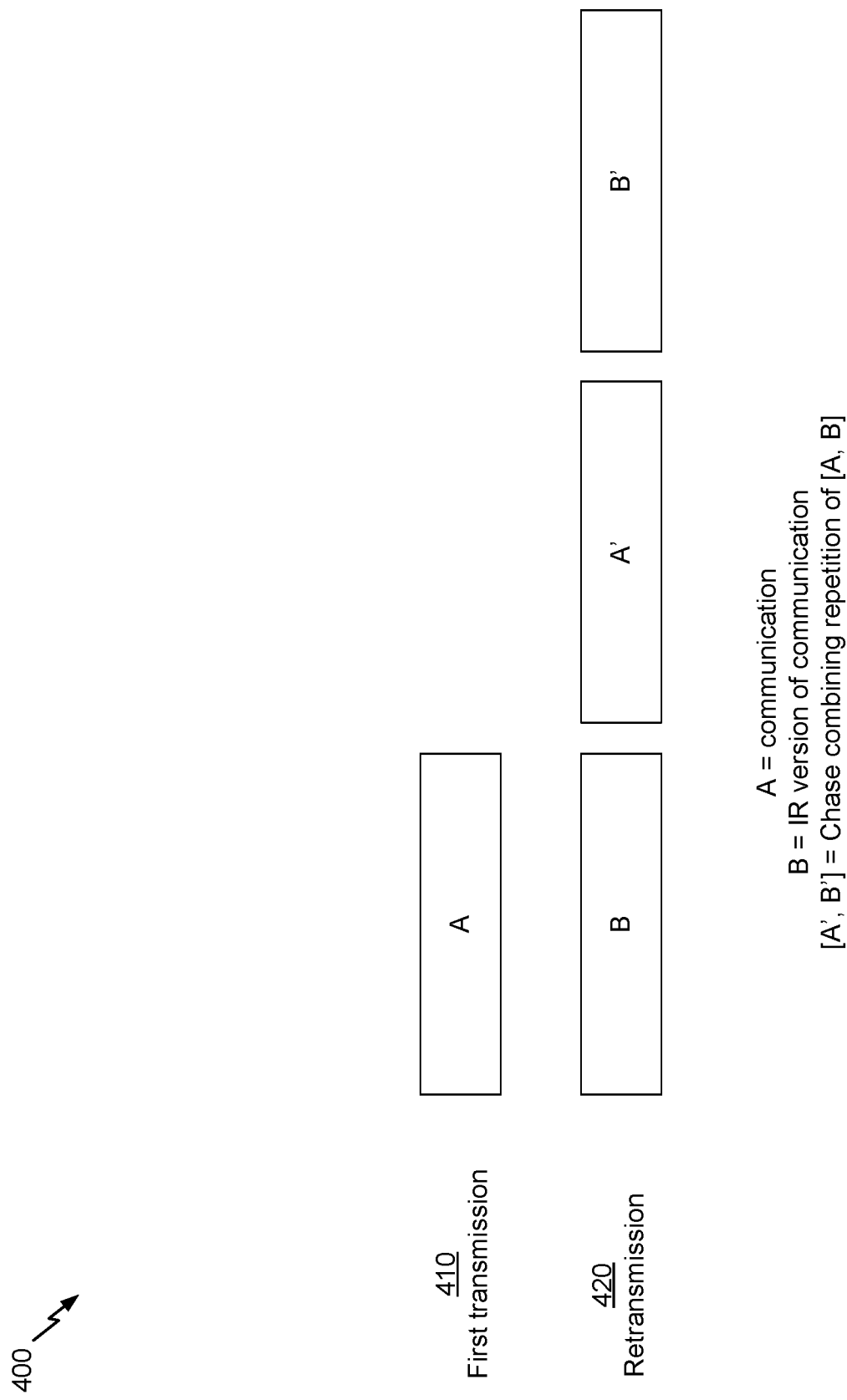

As shown in FIG. 4A, and by reference number 410, a first transmission of a communication may be performed in a first resource allocation, and may be denoted by the letter A. In FIGS. 4A-4D, a size of a resource allocated may be denoted by a horizontal length of the corresponding block. For example, a block with a larger horizontal length may be associated with a larger resource allocation than a block with a smaller horizontal length. The horizontal lengths of the blocks in FIGS. 4A-4D are not necessarily to scale or exactly proportionate with the size of the corresponding resource allocation.

As shown by reference number 420, a retransmission of the communication may be performed in a second resource allocation that is larger than the first resource allocation. As further shown, the retransmission may include an IR version of the communication. For example, the IR version may be denoted by B. In some aspects, a value of B (e.g., |B|) may be equal to a value of A (e.g., |A|). In some aspects, the value of B (e.g., |B|) may not be equal to a value of A (e.g., |A|). As shown, the retransmission may include one or more versions of the communication for Chase combination. For example, the retransmission may include a version of A (e.g., A') for Chase combination with the communication of the first transmission (e.g., A) and/or the IR versions of A (e.g., B and B'), and may include a version of B (e.g., B') for Chase combination with the IR version of A (e.g., B). In some aspects, the second transmission may be self-decodable without the first transmission.

Figure 4B:
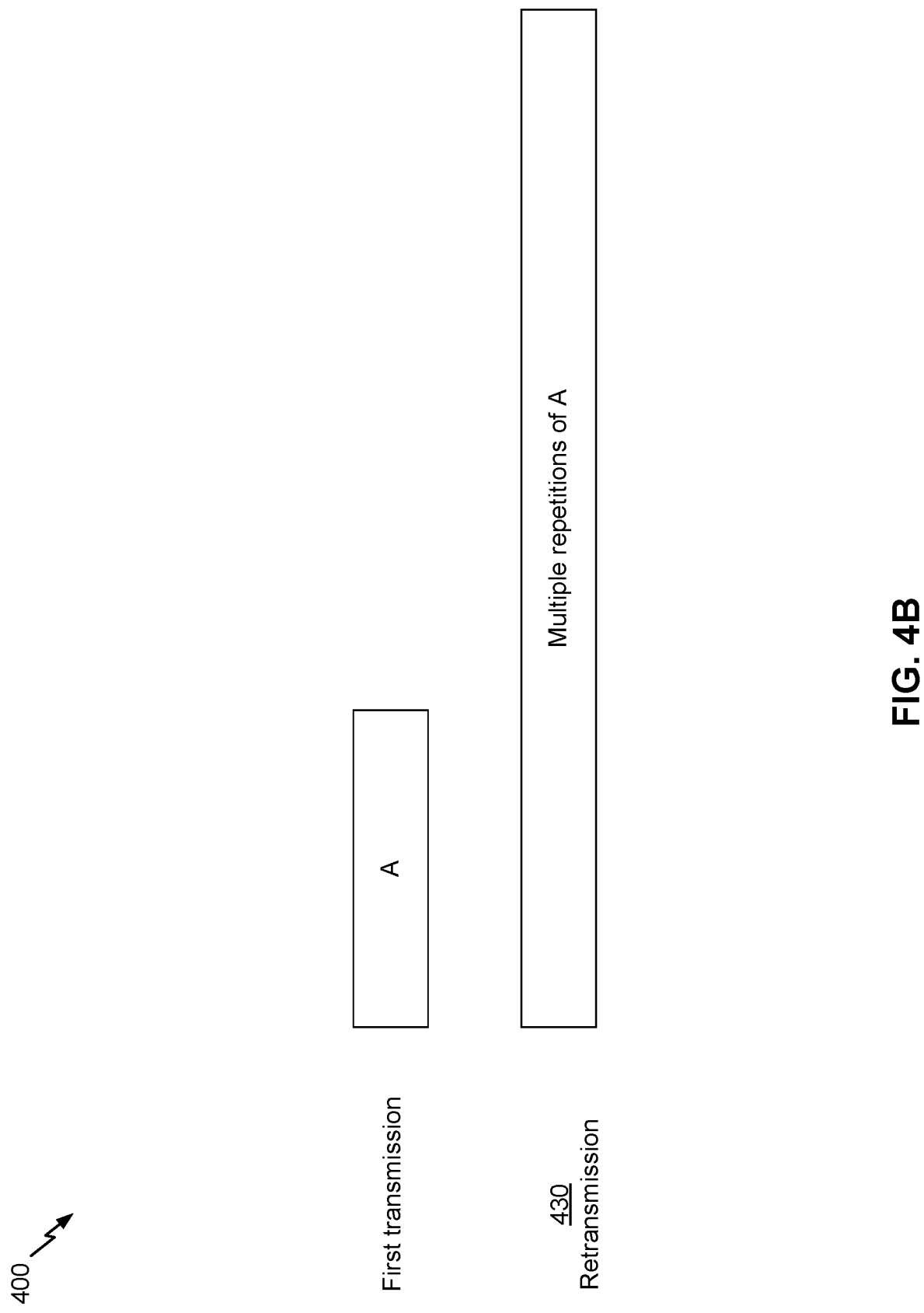

As shown in FIG. 4B, and by reference number 430, in some aspects, the retransmission may include multiple repetitions of A. For example, the multiple repetitions may be for Chase combination with the first transmission of A and/or with each other. In some aspects, the multiple repetitions may include a full repetition of A and/or a partial repetition of A. For example, the multiple repetitions may include 2 repetitions, 5 repetitions, 3.5 repetitions, 3.1 repetitions, and/or the like. In some aspects, the second transmission may be self-decodable without the first transmission.

Figure 4D:
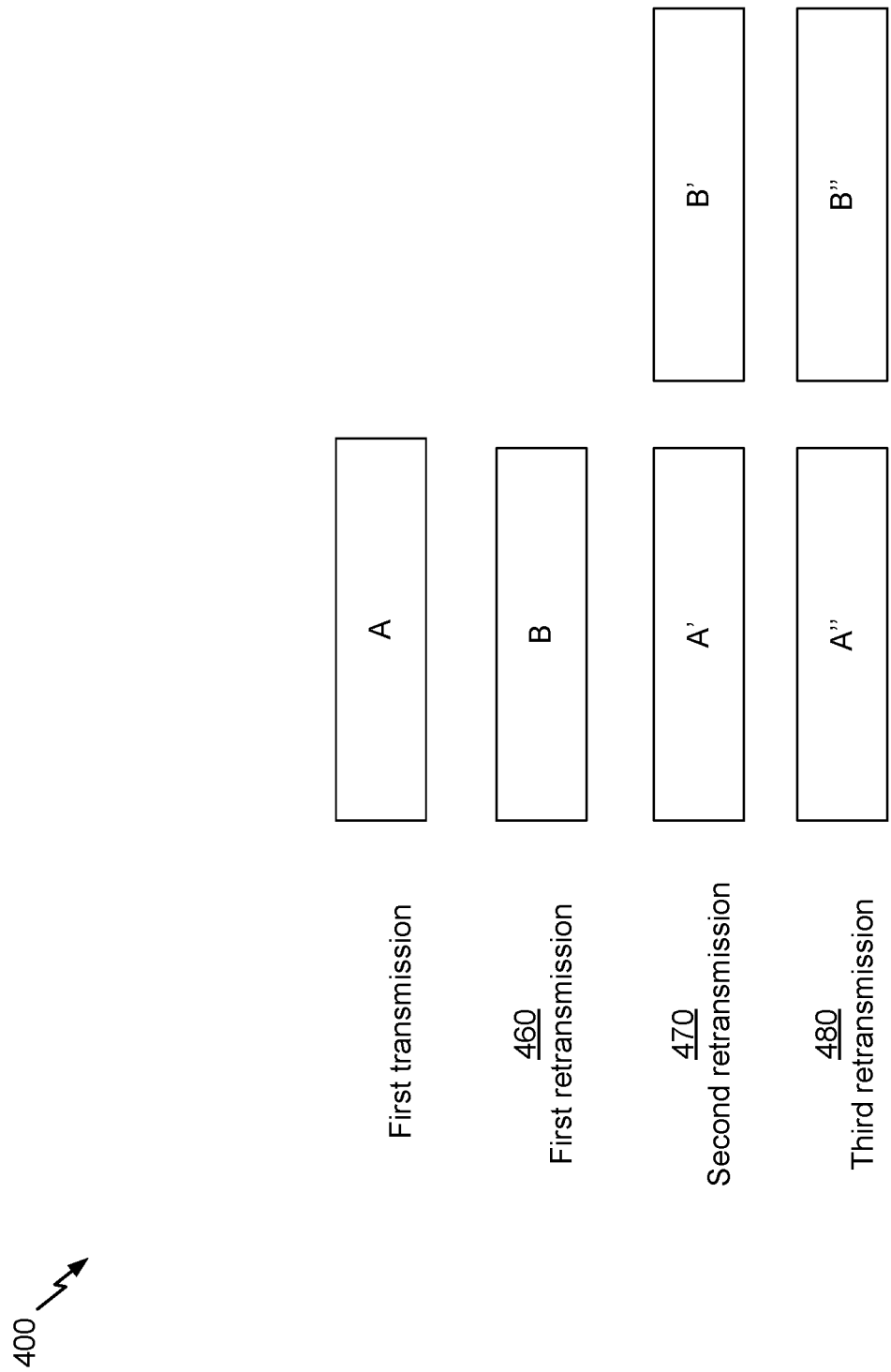

FIGS. 4C and 4D show examples wherein multiple retransmissions are performed. As shown in FIG. 4C, and by reference number 440, in some aspects, a first retransmission may include an IR version of A (e.g., B). As shown by reference number 450, in some aspects, a second retransmission may include versions of A and/or B for Chase combination (e.g., A' and B'). The first retransmission may be transmitted in a different resource or slot than the second retransmission, which may improve diversity of the communication and therefore improve reliability. In some aspects, the first retransmission and/or the second retransmission may be self-decodable without the first transmission and/or without each other. For example, each of the first transmission, the first retransmission, and the second retransmission may be self-decodable.

As shown in FIG. 4D, and by reference number 460, in some aspects, a first retransmission may include an IR version of the communication A (e.g., B). As shown by reference number 470, a second retransmission may include versions of A and B for Chase Combination (e.g., A' and B'). As shown by reference number 480, a third retransmission may include further versions of A and B for Chase combination and/or IR (e.g., A" and B"). In some aspects, the first retransmission, the second retransmission, and/or the third retransmission may be self-decodable without the first transmission and/or without each other. For example, each of the first transmission, the first retransmission, the second retransmission, and the third retransmission may be self-decodable.

As described with respect to FIGS. 4A-4D, in some aspects, A' may be equal (e.g., identical) to A. In some aspects, A' may be a subset of A. In some aspects, A' may be a null value. As one example, A' may be omitted from the second retransmission of FIG. 4D. Similarly, B' may be equal (e.g., identical) to B. In some aspects, B' may be a subset of B. In some aspects, B' may be a null value. As one example, B' may be omitted from the second retransmission of FIG. 4D. In some aspects, A' and B' may be provided in any order. For example, in some aspects, B' may precede A'.

As described with respect to FIG. 4D, in some aspects, A" may be equal (e.g., identical) to A. In some aspects, A" may be a subset of A. In some aspects, A" may be a null value. As one example, A" may be omitted from the third retransmission of FIG. 4D. Similarly, B" may be equal (e.g., identical) to B. In some aspects, B" may be a subset of B. In some aspects, B" may be a null value. As one example, B" may be omitted from the third retransmission of FIG. 4D. In some aspects, A" and B" may be provided in any order. For example, in some aspects, B" may precede A".

As indicated above, FIGS. 4A-4D are provided as examples. Other examples are possible and may differ from what was described with respect to FIGS. 4A-4D.

Figure 5:
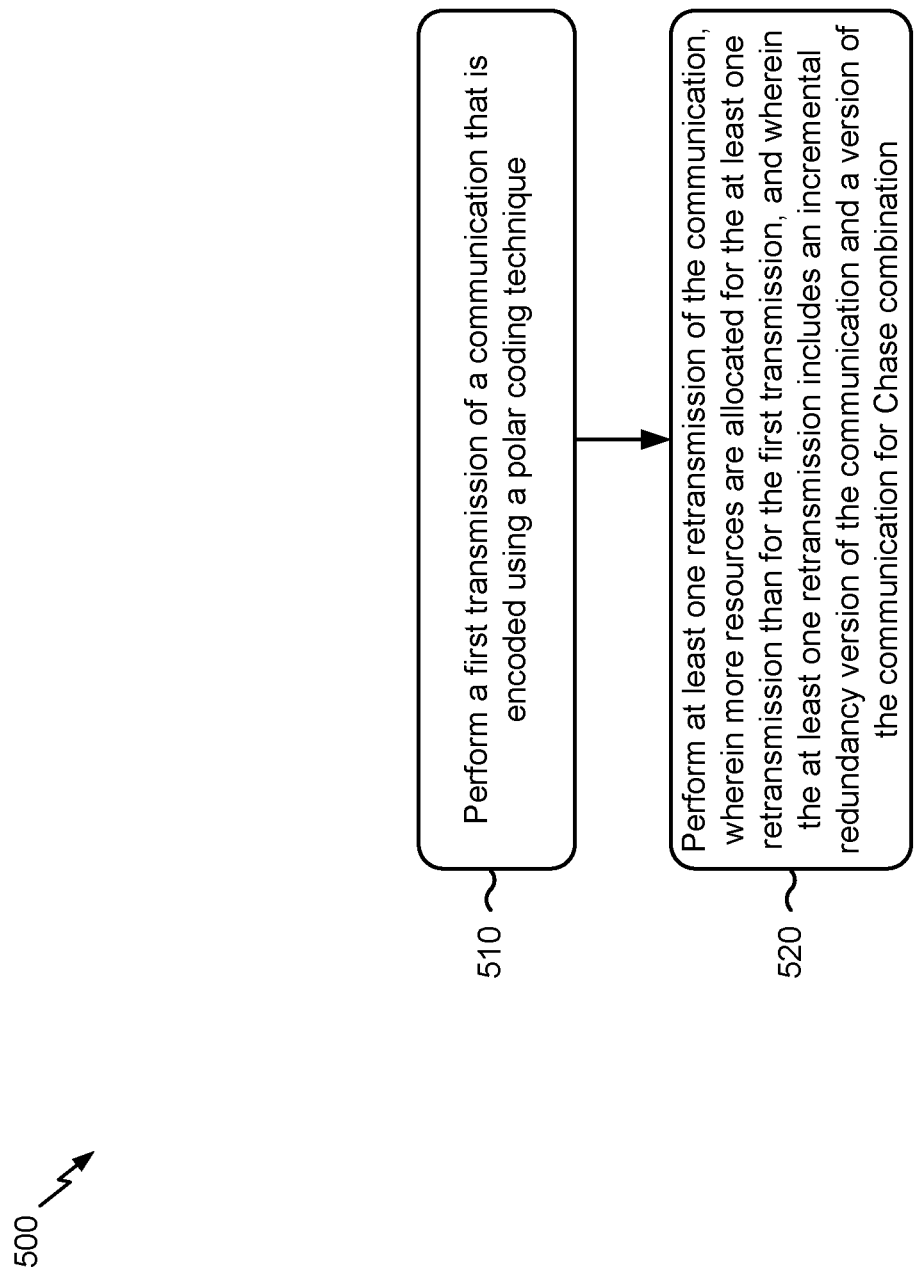
FIG. 5 is a diagram illustrating an example process performed, for example, by a wireless communication device, in accordance with various aspects of the present disclosure.

FIG. 5 is a diagram illustrating an example process 500 performed, for example, by a wireless communication device, in accordance with various aspects of the present disclosure. Example process 500 is an example wherein a wireless communication device (e.g., BS 110, UE 120, etc.) performs a HARQ technique for a polar coded URLLC communication.

As shown in FIG. 5, in some aspects, process 500 may include performing a first transmission of a communication that is encoded using a polar coding technique (block 510). For example, the wireless communication device may perform a first transmission. The first transmission may be a transmission of a communication that is encoded using a polar coding technique. In some aspects, the communication may be a URLLC communication.

As shown in FIG. 5, in some aspects, process 500 may include performing at least one retransmission of the communication, wherein more resources are allocated for the at least one retransmission than for the first transmission, and wherein the at least one retransmission includes an incremental redundancy version of the communication and a version of the communication for Chase combination (block 520). For example, the wireless communication device may perform at least one retransmission of the communication. The at least one retransmission may be allocated more resources than the first transmission, thereby improving efficiency of HARQ for the communication. The at least one transmission may include an IR version of the communication and/or a version of the communication for Chase combination.

Process 500 may include additional aspects, such as any single aspect or any combination of aspects described below.

In some aspects, the at least one retransmission is decodable without the first transmission. In some aspects, a value of the first transmission of the communication is different than a value of the incremental redundancy version of the communication. In some aspects, the version of the communication for Chase combination is a repetition of the first transmission of the communication. In some aspects, the version of the communication for Chase combination is a subset of the first transmission of the communication. In some aspects, the version of the communication for Chase combination is a repetition or a subset of the incremental redundancy version of the communication.

In some aspects, the at least one retransmission includes multiple versions of the communication for Chase combination. In some aspects, the incremental redundancy version of the communication is transmitted in a first retransmission of the at least one retransmission, and the version of the communication for Chase combination is transmitted in a second retransmission of the at least one retransmission. In some aspects, respective versions of the communication for Chase combination are transmitted in multiple second retransmissions of the at least one retransmission.

In some aspects, the first transmission of the communication and the at least one retransmission of the communication are for a hybrid automatic repeat request (HARM) operation. In some aspects, the communication is an ultra-reliable low latency communication, and the first transmission and the at least one retransmission are to achieve a latency threshold associated with the ultra-reliable low latency communication.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless communication device, comprising:
performing a first transmission of a communication that is encoded using a polar coding technique; and
performing at least one retransmission of the communication,
wherein more resources are allocated for the at least one retransmission than for the first transmission,
wherein the at least one retransmission includes an incremental redundancy version of the communication and a version of the communication for Chase combination, and
wherein at least one of:
the version of the communication for Chase combination is a subset of the first transmission of the communication,
the version of the communication for Chase combination is a repetition or a subset of the incremental redundancy version of the communication, or
the incremental redundancy version of the communication is transmitted in a first retransmission of the at least one retransmission, and the version of the communication for Chase combination is transmitted in a second retransmission of the at least one retransmission.

2. The method of claim 1, wherein the at least one retransmission is decodable without the first transmission.

3. The method of claim 1, wherein a value of the first transmission of the communication is different than a value of the incremental redundancy version of the communication.

4. The method of claim 1, wherein the version of the communication for Chase combination is a repetition of the first transmission of the communication.

5. The method of claim 1, wherein the version of the communication for Chase combination is the subset of the first transmission of the communication.

6. The method of claim 1, wherein the version of the communication for Chase combination is the repetition or the subset of the incremental redundancy version of the communication.

7. The method of claim 1, wherein the at least one retransmission includes multiple versions of the communication for Chase combination.

8. The method of claim 1, wherein the incremental redundancy version of the communication is transmitted in the first retransmission of the at least one retransmission, and wherein the version of the communication for Chase combination is transmitted in the second retransmission of the at least one retransmission.

9. The method of claim 8, wherein respective versions of the communication for Chase combination are transmitted in multiple second retransmissions of the at least one retransmission.

10. The method of claim 1, wherein the first transmission of the communication and the at least one retransmission of the communication are for a hybrid automatic repeat request (HARQ) operation.

11. The method of claim 1, wherein the communication is an ultra-reliable low latency communication, and wherein the first transmission and the at least one retransmission are to achieve a latency threshold associated with the ultra-reliable low latency communication.

12. A wireless communication device, comprising:
a memory; and
one or more processors operatively coupled to the memory, the memory and the one or more processors configured to:
perform a first transmission of a communication, that is encoded using a polar coding technique; and
perform at least one retransmission of the communication,
wherein more resources are allocated for the at least one retransmission than for the first transmission,
wherein the at least one retransmission includes an incremental redundancy version of the communication and a version of the communication for Chase combination, and
wherein at least one of:
the version of the communication for Chase combination is a subset of the first transmission of the communication,
the version of the communication for Chase combination is a repetition or a subset of the incremental redundancy version of the communication, or
the incremental redundancy version of the communication is transmitted in a first retransmission of the at least one retransmission, and the version of the communication for Chase combination is transmitted in a second retransmission of the at least one retransmission.

13. The wireless communication device of claim 12, wherein the at least one retransmission is decodable without the first transmission.

14. The wireless communication device of claim 12, wherein a value of the first transmission of the communication is different than a value of the incremental redundancy version of the communication.

15. The wireless communication device of claim 12, wherein the version of the communication for Chase combination is a repetition of the first transmission of the communication.

16. The wireless communication device of claim 12, wherein the version of the communication for Chase combination is the subset of the first transmission of the communication.

17. The wireless communication device of claim 12, wherein the version of the communication for Chase combination is the repetition or the subset of the incremental redundancy version of the communication.

18. The wireless communication device of claim 12, wherein the at least one retransmission includes multiple versions of the communication for Chase combination.

19. The wireless communication device of claim 12, wherein the incremental redundancy version of the communication is transmitted in the first retransmission of the at least one retransmission, and wherein the version of the communication for Chase combination is transmitted in the second retransmission of the at least one retransmission.

20. The wireless communication device of claim 19, wherein respective versions of the communication for Chase combination are transmitted in multiple second retransmissions of the at least one retransmission.

21. The wireless communication device of claim 12, wherein the first transmission of the communication and the at least one retransmission of the communication are for a hybrid automatic repeat request (HARQ) operation.

22. The wireless communication device of claim 12, wherein the communication is an ultra-reliable low latency communication, and wherein the first transmission and the at least one retransmission are to achieve a latency threshold associated with the ultra-reliable low latency communication.

23. A non-transitory computer-readable medium storing instructions for wireless communication, comprising:
one or more instructions that, when executed by one or more processors of a wireless communication device, cause the one or more processors to:
perform a first transmission of a communication that is encoded using a polar coding technique; and
perform at least one retransmission of the communication,
wherein more resources are allocated for the at least one retransmission than for the first transmission,
wherein the at least one retransmission includes an incremental redundancy version of the communication and a version of the communication for Chase combination, and
wherein at least one of:
the version of the communication for Chase combination is a subset of the first transmission of the communication,
the version of the communication for Chase combination is a repetition or a subset of the incremental redundancy version of the communication, or
the incremental redundancy version of the communication is transmitted in a first retransmission of the at least one retransmission, and the version of the communication for Chase combination is transmitted in a second retransmission of the at least one retransmission.

24. The non-transitory computer-readable medium of claim 23, wherein the at least one retransmission is decodable without the first transmission.

25. The non-transitory computer-readable medium of claim 23, wherein a value of the first transmission of the communication is different than a value of the incremental redundancy version of the communication.

26. The non-transitory computer-readable medium of claim 23, wherein the version of the communication for Chase combination is a repetition of the first transmission of the communication.

27. The non-transitory computer-readable medium of claim 23, wherein the version of the communication for Chase combination is the subset of the first transmission of the communication.

28. The non-transitory computer-readable medium of claim 23, wherein the version of the communication for Chase combination is the repetition or the subset of the incremental redundancy version of the communication.

29. The non-transitory computer-readable medium of claim 23, wherein the at least one retransmission includes multiple versions of the communication for Chase combination.

30. The non-transitory computer-readable medium of claim 23, wherein the incremental redundancy version of the communication is transmitted in the first retransmission of the at least one retransmission, and wherein the version of the communication for Chase combination is transmitted in the second retransmission of the at least one retransmission.

31. The non-transitory computer-readable medium of claim 30, wherein respective versions of the communication for Chase combination are transmitted in multiple second retransmissions of the at least one retransmission.

32. The non-transitory computer-readable medium of claim 23, wherein the first transmission of the communication and the at least one retransmission of the communication are for a hybrid automatic repeat request (HARQ) operation.

33. The non-transitory computer-readable medium of claim 23, wherein the communication is an ultra-reliable low latency communication, and wherein the first transmission and the at least one retransmission are to achieve a latency threshold associated with the ultra-reliable low latency communication.

34. An apparatus, comprising:
means for performing a first transmission of a communication that is encoded using a polar coding technique; and
means for performing at least one retransmission of the communication,
wherein more resources are allocated for the at least one retransmission than for the first transmission,
wherein the at least one retransmission includes an incremental redundancy version of the communication and a version of the communication for Chase combination, and
wherein at least one of:
the version of the communication for Chase combination is a subset of the first transmission of the communication,
the version of the communication for Chase combination is a repetition or a subset of the incremental redundancy version of the communication, or
the incremental redundancy version of the communication is transmitted in a first retransmission of the at least one retransmission, and the version of the communication for Chase combination is transmitted in a second retransmission of the at least one retransmission.

35. The apparatus of claim 34, wherein the at least one retransmission is decodable without the first transmission.

36. The apparatus of claim 34, wherein a value of the first transmission of the communication is different than a value of the incremental redundancy version of the communication.

37. The apparatus of claim 34, wherein the version of the communication for Chase combination is a repetition of the first transmission of the communication.

38. The apparatus of claim 34, wherein the version of the communication for Chase combination is the subset of the first transmission of the communication.

39. The apparatus of claim 34, wherein the version of the communication for Chase combination is the repetition or the subset of the incremental redundancy version of the communication.

40. The apparatus of claim 34, wherein the at least one retransmission includes multiple versions of the communication for Chase combination.

41. The apparatus of claim 34, wherein the incremental redundancy version of the communication is transmitted in the first retransmission of the at least one retransmission, and wherein the version of the communication for Chase combination is transmitted in the second retransmission of the at least one retransmission.

42. The apparatus of claim 41, wherein respective versions of the communication for Chase combination are transmitted in multiple second retransmissions of the at least one retransmission.

43. The apparatus of claim 34, wherein the first transmission of the communication and the at least one retransmission of the communication are for a hybrid automatic repeat request (HARQ) operation.

44. The apparatus of claim 34, wherein the communication is an ultra-reliable low latency communication, and wherein the first transmission and the at least one retransmission are to achieve a latency threshold associated with the ultra-reliable low latency communication.

* * * * *